United States Patent Office 2,802,815
Patented Aug. 13, 1957

2,802,815

ALKALI TREATED LIGNIN AND METHOD OF MAKING SAME

Joseph Bayne Doughty, Charleston, S. C., assignor to West Virginia Pulp and Paper Company, New York, N. Y., a corporation of Delaware No Drawing. Application February 2, 1953, Serial No. 334,739

6 Claims. (Cl. 260—124)

The present invention relates to a modified lignin and to methods of making same.

As is well known, lignin is the binding material which accompanies the cellulose fibers in nature. Large quantities of lignin are separated from the cellulose in the manufacture of pulp by chemical means. When the wood is cooked in alkaline liquors, i. e., those containing either caustic soda or a mixture of caustic soda and sodium sulfide, so-called kraft cooking liquor, the lignin is obtained in solution at the termination of the cook. On the other hand, when wood is cooked by acid reagents, as for example sodium or calcium bisulfite, the lignin originally present is solubilized in the form of lignosulfonates. These differ in properties from the lignin itself chiefly in that they are soluble in water whereas lignin is substantially insoluble in water although soluble in alkaline solution. Lignin may also be obtained as a residue in wood saccharification processes. Such lignin is not soluble in water or alkaline solution.

Lignin may be recovered from the black liquor, for example, by suitably concentrating the liquor, then precipitating the lignin by the addition of acid, coagulating the lignin by heat and recovering it by filtration as crude sodium lignate whereupon the crude product may be redissolved in water and precipitated as lignin with acid and recovered.

Many uses for lignin either as such or in the form of its sodium (or other) salt having been proposed. Examples are: dispersing agents for aqueous suspensions of various solids, as a binder for printing inks, as an ingredient in plastics, as an extender for resins in rubber compounding, as a reinforcing agent for rubber especially when it is coprecipitated with the rubber particles occurring in rubber lattices.

A disadvantage that has attended the use of lignin for many purposes including several of those above noted is its tendency when dissolved in certain alkaline solutions to revert to the gel form or precipitate out of solution. Thus mixtures containing lignin in solution often have brief "shelf" life. Upon investigation it has been found that the properties of lignin may be suitably modified by treatment with alkali not only to give a longer shelf life but also to impart to the lignin other desirable properties as will be pointed out hereinafter. While the degree of modification may be measured in other ways, the most convenient would appear to be the difference which is undergone in the acetone solubility. Thus untreated lignin has a solubility in acetone of from 20 to 80% (under the conditions herein specified) whereas lignin treated with alkali in accordance with the present invention may have its acetone solubility raised to above 95%. The shelf life of solutions of lignin so treated is greatly increased and in this manner lignin is made available for various uses which were not possible heretofore.

A further example of these uses is the stable mixture formed with neoprene latex. Other enhanced properties will be pointed out hereinafter.

I have found that the acetone solubility of lignin may be best increased by cooking lignin in an alkaline solution at temperatures between 140° C. and temperatures not substantially higher than 200° C. for a period of some hours. Below 140° C. the reaction which the lignin undergoes is very slow, and substantially above 200° C., as for example 250° C., the reaction if allowed to proceed for more than a short time, i. e., an hours or more, can proceed in other directions whereby a product is had which has a lesser rather than a greater acetone solubility. Alternatively, the black liquor in which the lignin is originally contained may be similarly treated with alkali and a lignin recovered having substantially the same increased acetone solubility. However, merely cooking the black liquor which is alkaline to start with without further addition of alkali is without effect.

The invention will be best understood by reference to the following illustrative examples wherein all the lignin referred to is derived from pulping of pine wood by the sulfate method.

*Example 1*

A solution of lignin was first prepared by slurrying 25 lbs. of lignin powder in water and then adding a solution of caustic soda until 11.3 lbs. of sodium hydroxide had been added, the total quantity of water present being 21 gals. The mixture was then passed to an autoclave and indirectly heated with steam at 160 lbs. steam pressure for six hours. At different times during the cooking 1000 ml. samples were withdrawn from the autoclave. The lignin of these samples and that of the remaining liquor after six hours cooking were isolated. After cooling, the treated lignin solutions were acidified with sulfuric acid to a pH of 2.0 and then heated to 85–90° C. to coagulate the lignin. The hot slurries were then filtered and the filter cakes washed with water on the filter. The lignin cakes were then removed from the filter press and dried at 105° C. in an oven for 24 hours.

*Example 2*

2000 ml. of black liquor from a mill producing a kraft pulp from pine wood and containing 118 g. lignin (available when the pH was adjusted to 9.5) was mixed with 1000 ml. of so-called white liquor normally used to cook pine wood by the kraft process containing 158 g. of active alkali and the mixture autoclaved as in Example 1. The white liquor is a cheap and convenient form of alkali readily available in a kraft pulp mill. At different times during the cooking, 200 ml. samples were withdrawn from the autoclave. The lignin in these samples and that in the remaining liquor after 9.5 hours cooking were isolated. The lignin was recovered in the following manner: With stirring the cooked liquor from the autoclave was treated with carbon dioxide gas over a period of about 2 hours until a pH of 9.5 was reached. (Pure carbon dioxide gas was used in this example because of convenience in the laboratory. Other readily available sources of carbon dioxide may be used, e. g., flue gas). The carbonated liquor was then heated with slow stirring to 85–90° C. Then the liquor was allowed to cool to 50 C. during which carbon dioxide gas was kept over the mixture to prevent air oxidation. The carbonated liquor at 50° was then filtered and the alkaline cake comprising crude sodium lignate removed from the filter. The cake was slurried in 2000 ml. of water and sufficient acid added to reduce the entire cake to a pH of 2.0. The addition of the acid served to precipitate the lignin as such and the slurry so formed was filtered and the filter cake washed with hot water. The lignin was removed from the filter and then dried in an oven at 105° C. for 25 hours.

It will be noted that in this example, only that lignin material was recovered which precipitated from the treated black liquor at a pH of approximately 9.5. Additional lignin can be precipitated from the mother liquor by further reducing the pH with sulfuric or other strong acid until a pH of 2 has been reached. The lignin obtained during the reduction of the pH from 9.5 to 2 has slightly different properties from the lignin obtained at pH's of 9.5 or above and commonly has a greater amount of impurities than the lignin precipitated at higher pH's. However, for many purposes the lignin obtained by carrying the pH down to 2 is entirely suitable. At whatever pH the lignin may be precipitated after having been treated with alkali as above described, it will have an increased acetone solubility over the original. Therefore if desired the treated black liquor according to this example may be neutralized to a pH of 2 with sulfuric acid in one operation and the lignin formed coagulated and separated by filtration substantially as set forth in Example 1.

The data of this example and of Example 1 are given in the following table:

Lignins other than those obtained by the pulping of pine wood by the sulfate method may also be used as the starting material in the foregoing examples, satisfactory results having been had with soda cooked lignin from hard wood which when received was 53% soluble in acetone and a semi-kraft lignin which when received had an acetone solubility of 80%. Both were rendered completely soluble.

In general the amount of alkali used in the cooking step should range from 0.3 to 0.4 lbs. of NaOH per pound of lignin. The use of substantially less than this amount of alkali will result in a lower acetone solubility, other conditions remaining the same. The time of cooking naturally is dependent upon the temperature used, longer time being required for lower temperatuers of cooking. Thus at 140° C. and 0.37 lb. of sodium hydroxide per pound of lignin, 8–10 hours are required, whereas at 170° C. and 0.37 lb. of sodium hydroxide per pound of lignin, 5–6 hours are required.

In lieu of starting with lignin as such, the sodium salt or other salts of lignin may also be used—in which case allowance should be made for the sodium already present.

| Lignin Source | | Alkali Source | | Cooking Conditions | |
|---|---|---|---|---|---|
| Type | Quantity | Type | Quantity | Time, Hr. | Temp., °C. |
| Lignin (Ex. 1) | 25 lb | Aqueous NaOH Solution. | 1.9 gals. containing 11.3 lbs. NaOH. | 1.0<br>1.5<br>2.0<br>6.0 | 149<br>152<br>154<br>169 |
| Black Liquor (Ex. 2) | 2,000 ml. containing 200 g. lignin. | White Liquor | 1,000 ml. containing 158 g. Active Alkali. | 2.0<br>4.5<br>5.5<br>9.5 | 154<br>165<br>166<br>164 |

Acetone solubilities were then determined for the products of the foregoing examples. The method employed was as follows: Completely dry lignin samples of 25 grams were placed in 250 ml. tared centrifuge bottles. 100 ml. acetone was added to each and the whole stirred with an electric stirrer for 15 to 20 minutes. The lignin-acetone mixtures were then centrifuged at 1500 R. P. M. for about 5 minutes. The liquid portions were decanted off and an additional 100 ml. of acetone added to the residual lignins. The stirring, centrifuging and decanting were repeated until no color was imparted to the acetone of the lignin-acetone mixtures. After the final decantation the residual lignins were air dried for several hours and then dried in an oven at 105° C. overnight. The amount of soluble lignin was determined in each case by difference.

The results of the foregoing examples are given in the following table:

| Lignin Source | Cooking Time, Hrs. | Acetone Soluble, Percent | Organic Sulfur Content, Percent | Sintering Point, °C. |
|---|---|---|---|---|
| Lignin (Ex. 1) | 1<br>1.5<br>2.0<br>6.0 | 57<br>60<br>67<br>98 | 0.40 | 193–197 |
| Black Liquor (Ex. 2) | 2.0<br>4.5<br>5.5<br>9.5 | 66<br>79<br>89<br>94 | 0.45 | 195–198 |
| Uncooked Lignin | None | 53 | 1.5 | 210–225 |

In general yields from 92 to 99% will be had when lignin or a salt thereof are treated with alkali in the manner above set forth. When black liquor is so treated the yield will vary depending on how much of the treated lignin is recovered but if all the lignin is precipitated the yield will be substantially the same as when black liquor itself is untreated.

Desirably the cooking should not extend beyond the point where a lignin of 98–99% acetone solubility is obtained, a condition which may be determined by taking test samples from time to time and running them for acetone solubility. The temperatures most used for treating lignin to increase its acetone solubility have been those furnished by the high pressure steam available in the usual pulp mill, i. e., of 120 lbs. gage, thus affording a cooking temperature of substantially 170° C. However, temperatures in excess of 200° C. have been successfully used. Thus a small bomb containing the lignin and alkali reagent as set forth in Example 1 was quickly submerged in a liquid bath at 250° C. The temperature of the bath dropped to 225° C. within 5 minutes, then upon heating rose to 243° C. within 35 minutes, the whole heating taking about 40 minutes. The lignin isolated from the mixture was completely soluble in acetone. However, if the time of heating be prolonged to 2 hours, the lignin was precipitated as an insoluble tarry product. In general I prefer not to operate above 250° C.

The improved lignins according to my invention may be further distinguished from untreated lignin as follows:

1. *By differing solubilities.*—In addition to the differing solubility in acetone, the modified lignin is found to be completely soluble in methyl-ethyl ketone whereas ordinary lignin is only partially soluble in it. This increased solubility is particularly noticeable in other ketone solvents. It is less soluble in methanol than is ordinary lignin. It is partially soluble in some organic nitro compounds in which lignin is insoluble.

2. *As revealed by mixtures with neoprene latex and other tests.*—50 grams of oven dried lignin was slurried in 183 ml. water in a 600 ml. beaker. To this mixture was added with rapid stirring 11 ml. of 25% aqueous sodium hydroxide solution. To the resulting solution was added 2.4 grams of Dowicide G (or other suitable germicide) and .6 gram of pine oil. The entire solution was then heated to 180° F. by placing the beaker in a bath of boiling water. About 15 minutes was required to reach the temperature which was maintained for 15 minutes. The beaker and contents were then cooled to 80° F. in a bath of running tap water, about 15 minutes being required to so lower the temperature. With slow agitation the lignin solution was added to about 200 ml. of neoprene latex containing 100 grams solids in a 16 oz. wide-mouthed bottle. The pH and viscosity were determined and the bottle set aside for observation.

A similar mixture was made up in exactly the same manner but using treated lignin having an acetone solubility of 90–100%. Viscosities were measured by the Brookfield viscosimeter. After two days the batch made with ordinary lignin had gelled to a solid mass. On the other hand, the same mixtures made with lignin having a solubility of 95% in acetone had their viscosity (around 220 centipoises) unchanged after 34 days.

3. Mixtures of neoprene latex and lignin have been found useful as bonding and reinforcing agents for cellulose and other fibers and for ceramics, as well as a binder for glass fibers in battery separators and as an impregnant for paper board.

4. Solutions of 100 grams of treated lignin, 125 grams of formamide, 125 grams of water, and 5 grams of sodium hydroxide remained fluid for many months while a like mixture containing untreated lignin gelled or the lignin precipitated within a few days or a week. In addition the sintering point of the treated lignin is a number of degrees lower than the untreated as will be noted from the table in column 3.

5. The viscosity of the alkaline solutions is less; for example, a 20 and 25% alkaline solution of untreated lignin (9.5% NaOH based on the lignin weight being used to dissolve the lignin) gave viscosities of 22 and 14,500 centipoises respectively, whereas like solutions of the treated lignin solutions gave viscosities of only 16 and 2700 centipoises respectively.

For some purposes the solution of the treated lignin may be used as such without actually recovering the modified lignin. It will be understood that the improved lignins according to this invention may find uses both as the lignin per se (i. e. the acid form) or as a salt thereof especially the sodium or other alkali metal salt.

Other alkali metal salts such as potassium and lithium may, if desired, be used in lieu of sodium as the treating agent. However, sodium is preferred because of its cheapness and the fact that sodium lignate may be used as the starting material.

In the claims the acetone solubility of the lignins refers to that determined by the procedure for obtaining acetone solubilities set forth in the specification.

I claim:

1. The method of modifying lignin obtained from the alkaline pulping of wood to produce a lignin which has its acetone solubility increased from an initial value of from 20–80% to give increased solubility thereof in methyl-ethyl ketone, increased shelf life of alkaline solutions thereof, and of mixtures therewith of neoprene latex, which comprises heating an aqueous solution of said lignin in alkali metal hydroxide solution to within the approximate range of 140–250° C. and maintaining such temperature until the acetone solubility as shown by test is increased to the desired value up to substantially complete solubility but stopping the reaction before appreciable destruction of the lignin-like character of the product takes place, the amount of alkali used being on the order of from 0.3 to 0.4 pound per pound of lignin started with.

2. The improved lignin product produced according to claim 1 having an acetone solubility not substantially less than 90%.

3. The method according to claim 1 in which the lignin started with is in solution in the original black liquor.

4. The improved lignin product produced according to claim 3, having an acetone solubility not substantially less than ninety percent.

5. The method according to claim 3, including the additional steps of acidifying the treated mixture and coagulating the precipitated, modified lignin formed, and recovering same.

6. The improved lignin product produced according to claim 5, having an acetone solubility not substantially less than ninety percent.

References Cited in the file of this patent

UNITED STATES PATENTS

| | | |
|---|---|---|
| 2,186,509 | Wallace | Jan. 9, 1940 |
| 2,200,784 | Wallace | May 14, 1940 |
| 2,247,210 | Schorger | June 24, 1941 |
| 2,453,213 | Farber | Nov. 9, 1948 |
| 2,576,418 | Salvesen | Nov. 27, 1951 |
| 2,697,702 | Heritage et al. | Dec. 21, 1954 |